Aug. 16, 1960

W. G. PFANN 2,949,348

SEPARATION PROCESS

Filed April 23, 1958

INVENTOR
W. G. PFANN
BY
George S. Indig
ATTORNEY

Aug. 16, 1960    W. G. PFANN    2,949,348
SEPARATION PROCESS
Filed April 23, 1958    4 Sheets-Sheet 2
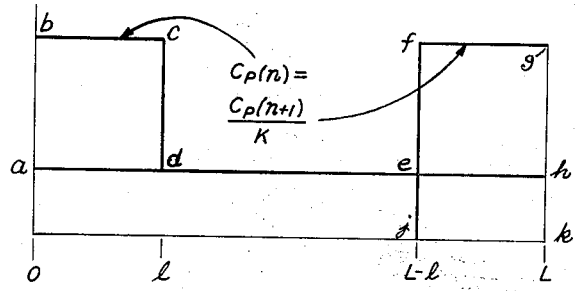
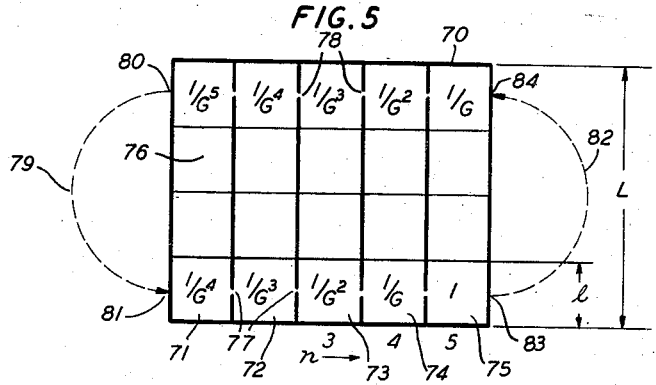
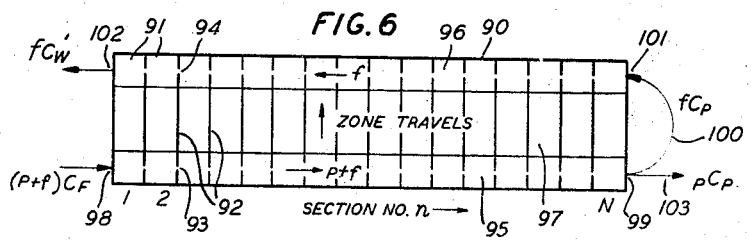
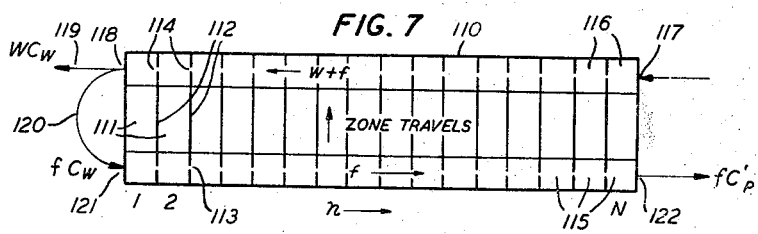
INVENTOR
W. G. PFANN
BY
George S. ———
ATTORNEY Aug. 16, 1960 W. G. PFANN 2,949,348
SEPARATION PROCESS
Filed April 23, 1958 4 Sheets-Sheet 4

ZONE TECHNIQUE

NORMAL-FREEZE TECHNIQUE

INVENTOR
W. G. PFANN
BY
George S. Indig
ATTORNEY

2,949,348

SEPARATION PROCESS

William G. Pfann, Far Hills, N.J., assignor to Bell Telephone Laboratories, Incorporated, New York, N.Y., a corporation of New York Filed Apr. 23, 1958, Ser. No. 730,458

10 Claims. (Cl. 23—310)

This invention relates to processes for redistributing ingredients of fusible solute-solvent systems for the purpose of producing material of desired composition. The processes herein, which may be operated in batch or continuous fashion, utilize variations in solute solubility in adjacent solid and liquid phases in the material being treated, to effect redistribution of such solute and may be applied to systems of metals and their alloys; to semiconducting elements and compounds; to salts and salt solutions, both organic and inorganic and to other solute-solvent systems which can be caused to undergo a liquid-solid-liquid transformation. In operation, separation of components within a given system is effected by the preference shown for the molten or solid phase at a moving freezing interface. Feed, product, waste and reflux flows are superimposed upon the interface movement. In batch operation, the processes herein are carried out in a completely closed system. This mode of operation is analogous to total reflux in a distillation column and results in the greatest degree of separation obtainable for a given refiner.

In continuous operation, product and waste materials are withdrawn and feed material is added, the separation between waste and product streams for a given geometry being determined by the percentage reflux.

As is discussed herein, the moving solid-liquid interface essential to all of the processes of this invention, may be produced either by the method now known as zone-melting (U.S. Patent 2,739,088, issued March 20, 1956) or by normal freezing (by which a molten body is frozen unidirectionally). Although the mechanics of the zone-melting procedure may be utilized to advantage herein, the processes of this invention are not necessarily considered as zone-melting. However, these processes bear a superficial resemblance to a continuous zone-melting procedure known as "cross-flow zone-refining" described in copending United States application Serial No. 719,216, filed March 20, 1958, and it is convenient to make reference to at least the operational aspects of that process.

The inventive processes have certain striking characteristics as compared with other separation procedures utilizing solid-liquid interfaces. Most important, whereas in most other such processes the degree of separation along a given column length in the direction of interface travel is limited by the theoretical ultimate distribution which may be tolerated for such length, these processes are not so limited. Accordingly, the maximum degree of separation realizable by use of a process of this invention may be appreciably greater than that obtainable in any other zone-melting or normal-freezing operation utilizing the same refiner area. Although this advantage is best realized when the batch mode of operation is utilized, it is retained in continuous operation to a greater or lesser degree, depending upon the reflux ratio. Where the processes of this invention are operated in continuous fashion, they enjoy certain advantages inherent in all continuous operation as contrasted with batch operation. Such advantages include ready adaptation to automatic operation, once the steady state has been attained with concomitant economy in apparatus cost and manpower requirements; rapid recovery of purified product; and the feasibility of adding a solvent material having a preference for a given component of a binary or higher order material undergoing processing to improve separation.

In essence, the processes of this invention make use of the movement of two or more freezing solid-liquid interfaces following distinct, generally parallel paths, through a body or bodies of solid material. These traversal paths are physically separated over their entireties, provisions, however, being made for cross-flow of material, ideally liquid phase material, between corresponding regions in the two interface paths at at least two positions along each such path, such positions generally corresponding with the termini of the paths. Cross-flow of material is in accordance with the antiparallel mode by which, for example, flow is from left to right across one path position and from right to left across the other cross-flow position. Reflux is provided by recycling a certain amount of cross-flow material so that some material leaving one cross-flow path is caused to enter the other cross-flow path.

The processes of this invention may be operated in batch or continuous fashion. In batch operation, the desired amount of material is placed in the system, the system is closed, run through the desired number of cycles, the system is opened and the processed material withdrawn. As in other batch operations, the degree of purification or enrichment and the volume output are determined by the fraction treated as product.

In continuous operation, a complete system in accordance with this invention may include both an enriching and a stripping section, with feed material being introduced intermediate the two sections, and product and waste being withdrawn, one from each section. As in other continuous separation processes, it may be desirable to operate but a single section so that a continuous process of this invention may include only a stripping section or an enriching section. The desirability of such operation is dependent upon the distribution coefficients of the system undergoing processing, on the volume output desired, and on other considerations well known to those versed in the art.

Whether the processes of this invention are operated in batch or continuous fashion, provision is made for reflux flows of material as described above. In common with fractional distillation operations, the volume of material in the reflux stream divided by the total amount of material in the cross-flow stream, determines the reflux ratio for the position of concern in the system. As is discussed herein, the ease of varying the reflux ratio and also other parameters, such as the ratio of cross-flow to zonal volume, imparts a broad flexibility to these processes. By varying these and other parameters for a given apparatus design, operating conditions may be adjusted to be most favorable for the particular system undergoing treatment, in accordance with the particular process objective.

As in other separation processes utilizing the segregation effect of a moving solid-liquid interface, separation of components of the system undergoing treatment is, in the first instance, due only to this phenomenon. In the processes of this invention such interface redistribution is effected in each of two or more physically separated interface traversal paths here referred to as sections. Antiparallel plug-like flow of critical amounts of liquid material from section to section at each of two positions in the traversal paths of the interfaces results in the transfer of processed material from section to section in such manner as to result in a concentration gradient in a direction generally normal to the direction of interface movement. The moving interfaces perform the function of moving solute material or materials either in the direction of interface movement or oppositely, in accordance with the value of the distribution coefficient and, therefore, remove solute of concern from one cross-flow stream and deposit it in the other. The cross-flow streams then move material from section to section so that each succeeding interface of each succeeding section operates, not on feed material, but on product material from a preceding or subsequent section. The provision for reflux effectively removes the ultimate distribution between feed and product realizable for a given section length as a limiting factor on the process. The separation realizable by the process herein is primarily dependent upon the value of reflux ratio and cross-flow volume and may be many times that resulting from the ultimate distribution realizable for any other crystallization process using apparatus of the same physical dimensions.

This specification is based on certain simplifying assumptions made for ease of description. Most derivations herein are based on interface movement by the zone-melting mode, this mode generally representing the most economical type of operation and resulting in a generally substantial saving in thermal energy. The alternate mode of operation is by normal-freezing. Although equations are not derived for the normal-freezing type of operation, those presented serve as a first order approximation for such operation. Although the invention is described primarily in terms of solid bodies of material and traversing liquid portions or liquid-solid interfaces, at least the initial form of the material undergoing processing may be in granular or form other than that generally suggested by the term "body."

For simplicity, discussion is generally in terms of product and waste materials, although it should be understood that either or both exit materials may be of a desired composition for a given objective and, therefore, properly considered as a "product." It may be that the objective of a process herein is directed not to the separation of components initially present, but to the addition of one or more other materials. The addition of such materials may be intended to effect a change in the characteristics of the starting material as, for example, by the addition of significant solutes to an extrinsic semiconductive material, or may be intended to result in a chemical reaction so as to produce a product composition differing from any of the intial materials. Where such reaction material is a desired product, the processes herein may operate not only to realize this end, but to simultaneously remove from the product so formed any undesirable impurities such as reactant material which are then withdrawn through a waste port.

The invention is generally described in terms of materials in which the solute of concern has a distribution coefficient of a numerical value less than unity and in which the desired end product is purified solvent.

In accordance with this convention and the other simplifying assumptions set forth above, moving freezing solid-liquid interfaces effectively sweep the undesirable solute material from the initial position of the interface in the vicinity of one cross-flow stream to a terminal position coinciding with a second cross-flow stream. Accordingly, where operation is in continuous fashion so that processed materials are removed, product is withdrawn from the cross-flow stream coinciding with the original positions of the moving interfaces and waste is withdrawn from the stream coinciding with the terminal positions of such interfaces.

Despite these conventions, however, and in common with other separation processes utilizing moving liquid-solid interfaces, it is required only that one or more solute materials of concern have a distribution coefficient unequal to unity at such interfaces between corresponding liquid and solid phases in equilibrium. Whether such distribution coefficient, here designated by the symbol $k$, be greater or less than 1, or whether it be due primarily or in part to the addition of solvent material not originally present in the material to be processed or even to a reaction product not initially introduced into the system, is of interest only in the design of the apparatus in which these processes are to be carried out. Although the processes herein, in the first instance, owe their effect to the mechanism of separation resulting from moving solid-liquid interfaces, it is a characteristic of these procedures that the degree of separation between materials of a given phase at opposite ends of a given section may be small in a steady state continuous operation and may, in fact, approach the vanishing point in batch operation. An understanding of these and other characteristics of the processes of this invention are facilitated by reference to the attached drawings in which:

Figure 8:
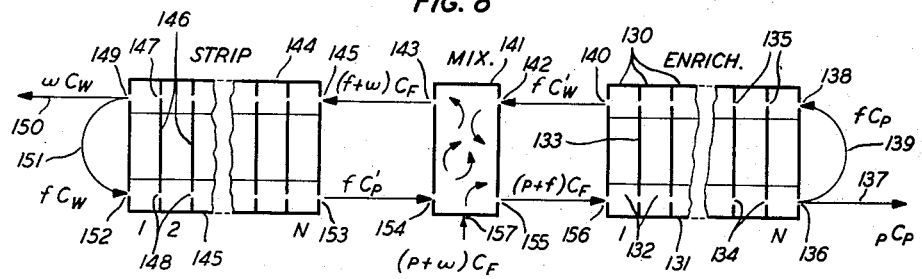
Figure 9:
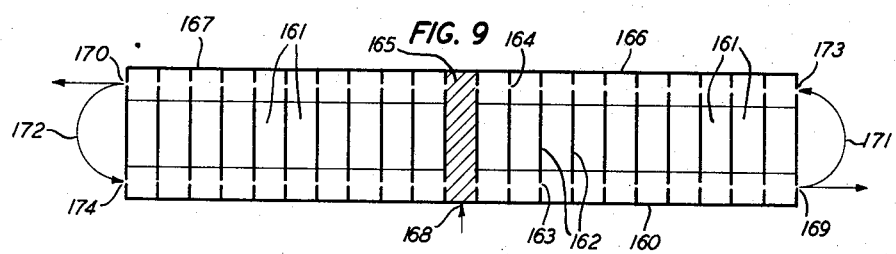
Figure 10:
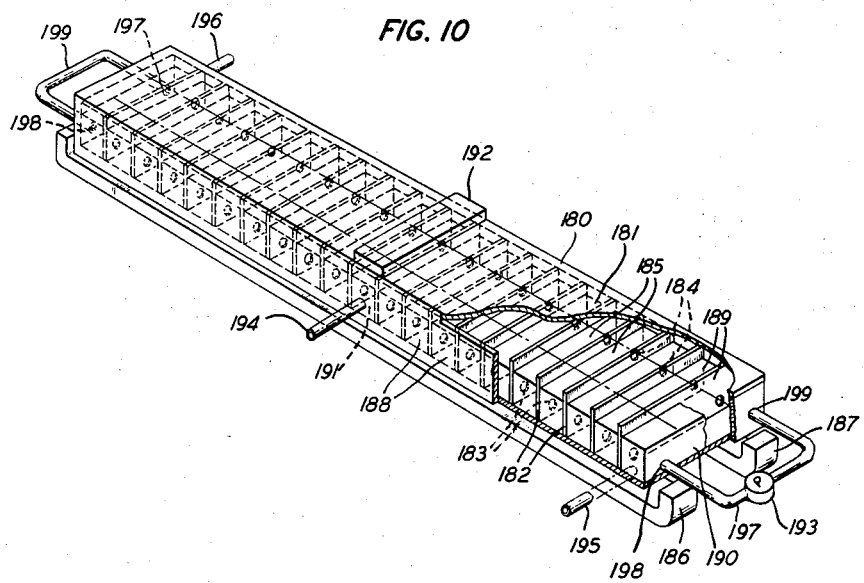

Fig. 4, on coordinates of solute concentration on the ordinate and distance along a single section on the abscissa, is a plot denoting the relative solute concentrations in the $n$th section at the beginning and end of a single interface traversal;

Fig. 5 is a diagrammatic plan view of a five-section reflux cross-flow refiner in the steady operation state to which reference is made in a discussion describing relative liquid concentrations within a refiner;

Fig. 6 is a diagrammatic plan view of a continuous enriching section which may constitute an entire process or be a portion of a process also including a stripping section;

Fig. 7 is a diagrammatic plan view of a continuous reflux cross-flow stripping section;

Fig. 8 is a diagrammatic plan view of a continuous cross-flow refining operation including a stripping section, an enriching section and a mixing chamber;

Fig. 9 is a diagrammatic plan view of a continuous two-section process as carried out in apparatus alternative to that of Fig. 8;

Fig. 10 is a perspective view, partly in section, of a two-section continuous cross-flow process as carried out in the apparatus of Fig. 9;

Figs. 11A, 11B, 11C and 11D are side elevation views in section taken through a single section of a refiner, illustrating the sequential position of heaters and corresponding molten zones in accordance with the zone-melting mode described herein; and Figs. 12A, 12B, 12C and 12D are side elevation views in section taken through a single section of a refiner, illustrating the sequential position of heaters and corresponding molten regions utilized in accordance with the normal-freezing mode of operation herein.

Referring again to Fig. 1, there is depicted a typical reflux cross-flow refining operation as operated in batch. The apparatus shown includes a closed receptacle 1 made of a suitable refractory material, such as quartz, glass, aluminum, graphite or other material depending upon the melting point and chemical reactivity of the system undergoing treatment. Receptacle 1 is provided with ports 2, 3, 4 and 5 and contains partitions 6 each provided with two orifices 7 and 8, closely fitting heaters not shown which may, for example, contain resistance or radio frequency heating elements, such heaters being movable with respect to receptacle 1 and creating molten regions 9 and 10. Molten regions are caused to traverse material undergoing treatment 11 containing in each of sections 12 from initial position 9 to terminal position 10, the arrangement for the apparatus depicted being such, however, that with molten regions at position 10 there are additional molten regions at position 9 so that molten material is simultaneously present in the positions of orifices 7 and 8. As is described herein, material at positions 10 may be maintained molten throughout the entire cycle, separation taking effect only at the trailing interface between moving molten regions and solid material of system 11. A pipe or other provision 13 enables liquid material to flow from liquid regions 10 to liquid regions 9, similar provision 14 enabling a completion of the cycle from port 3 to port 4. In operation, liquid material is caused to flow in a counter-clockwise direction from port 2 through orifices 7, port 3, pipe 14, port 4, orifices 8, port 5 and pipe 13. Flow is produced by pump 15, the amount of material flowing with the molten regions 9 and 10 in the positions depicted being controlled by valve 16. Feed material is introduced through valve 17, pipe 18 and port 2 during the setting up period. In operation, valve 17 is kept closed. It is opened again only to withdraw treated material at the end of the batch operation.

In the steady state with receptacle 1 filled with material 11 undergoing treatment, and with molten zones 9 and 10 both extending through all sections 12, a fraction $f$ of the zone volume per section is shifted to the right a distance of one section through orifices 7, and to the left a distance of one section through orifices 8. Zones 9 are then caused to traverse sections 11 toward positions 10. Upon attaining positions 10, new zones 9 are introduced, as depicted, and the cycle is repeated. The effect of the moving zones is to carry solute from the product stream at the bottom of the refiner and to deposit such solute in the waste stream at the top of the refiner, as depicted. The lateral motion of the streams through orifices 7 and 8 in the antiparallel directions, results in a concentrating of solute at the left end of the refiner and of purified solvent at the right.

Figure 1:
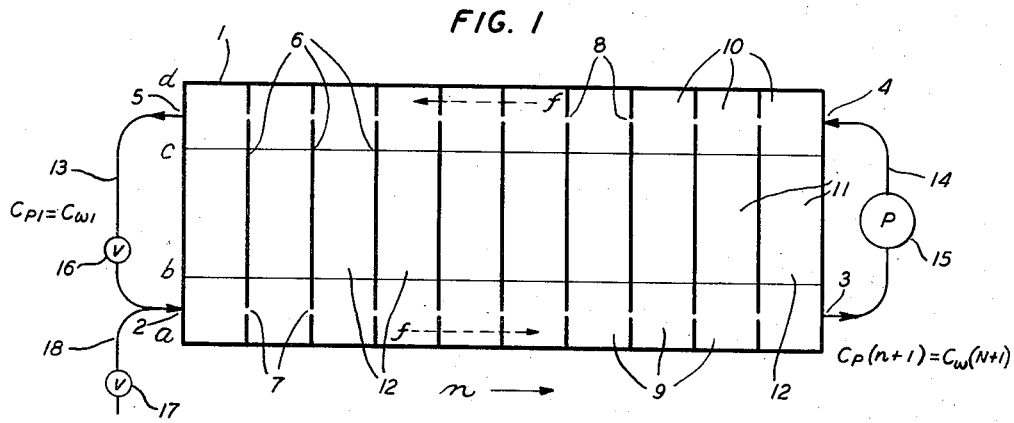
Fig. 1 is a diagrammatic plan view of a ten-section reflux cross-flow refiner arranged for batch operation.

Although the process depicted in Fig. 1 utilizes two molten zone positions, so that product and waste flows can be continuous and simultaneous at such position, the same type of process can be carried out with but a single zonal position through all sections. In accordance with such alternate operation, cross-flow is first produced at positions 9. The material ejected through port 3 is stored, for example, at pump 15 and is reintroduced into the system through port 4 when the zone position corresponds with positions 10 in sections 11. The refiner which need not be planar in form, may be horizontal, vertical or at any other angle. Product and waste flows may be produced or aided by gravity, for example, by tilting the entire refiner in the direction of such flow or flows. Depending upon the reactivity of the material undergoing treatment, the system may or may not be closed from the atmosphere and a protective atmosphere may or may not be desired.

Figure 2:
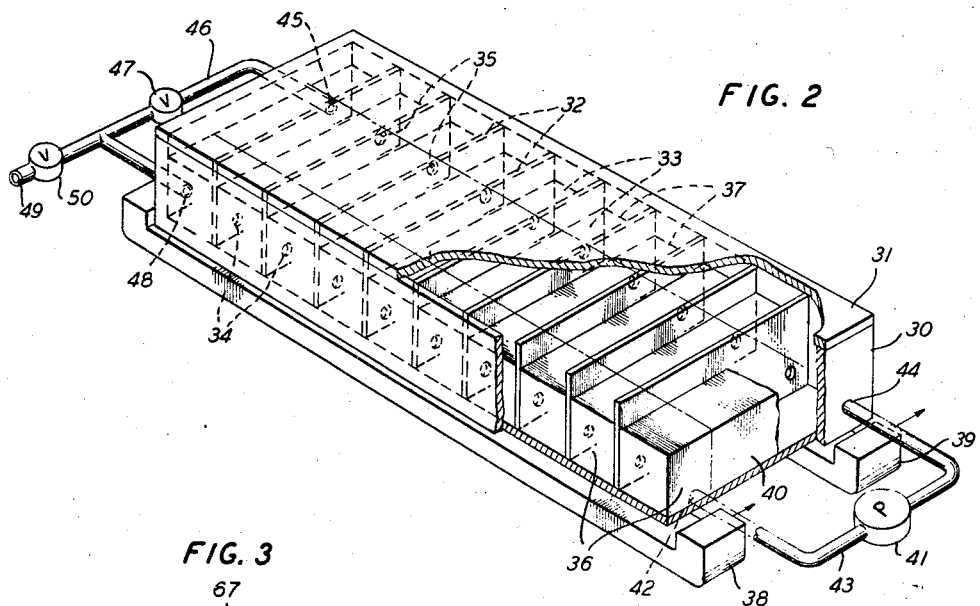
Fig. 2 is a perspective view, partly in section, of a batch refiner such as that depicted in Fig. 1.

Fig. 2 is a perspective view of a batch refiner such as that shown in Fig. 1. Such refiner includes receptacle 30, provided with cover 31 and partitions 32 separating sections 33 along their entirety, except at orifices 34 and 35. Molten zones 36 and 37 are produced by strip heaters 38 and 39. Movement of strip heaters 38 and 39 in the direction shown by the arrows results in the traversal of zones 36 and 37 through material 40 undergoing treatment. Pump 41 results in counter-clockwise cross-flow of molten material through orifices 34, port 42, pipe 43, port 44, orifices 35, port 45, pipe 46, valve 47 and back into the refiner through port 48. The volume of cross-flow material is controlled by valve 47, by the size of orifices 34 and 35 and the steady or intermittent pressure applied by the pump 41. During setting up, material undergoing treatment may be introduced through pipe 49, open valve 50 and port 48 after which valve 50 is closed. After completion of the process, valve 50 may be again opened and material withdrawn through pipe 49. Where it is necessary to remove treated material through pipe 49, it is convenient to render molten a portion of the total material within the refiner corresponding with the fraction to be removed so that waste compositions may, for example, correspond with the first two sections of the refiner from left to right with the last eight sections corresponding with product composition.

Figure 3:
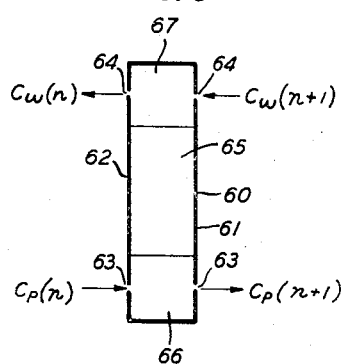
Fig. 3 is a diagrammatic plan view of a single section of a refining operation herein, to which reference is made in the derivation of equations.

Fig. 3 represents the $n$th section of the refiner of Fig. 1. This section denoted 60 is separated from adjoining sections by partitions 61 and 62 having orifices 63 and 64 and, for the condition shown includes solid regions 65 and molten regions 66 and 67.

Reference is made to Figs. 1 and 3 in defining the following symbols which appear in the equations herein:

$n$ = section number.
$N$ = total number of sections.
$f$ = fraction of the zone volume in a section that is transferred. It is here assumed that the zone volume is unity so that $f$ represents the actual volume transferred.
$C$ = solute concentration in grams per cubic centimeter.
$C_{p(n)}$ = the solute concentration in the liquid "entering" the $n$th section at the front of the refiner.
$C_{p(n+1)}$ = the liquid concentration leaving the $n$th section at the front, i.e., in the product stream.
$C_{w(n)}$ = the liquid concentration leaving the $n$th section at the back of the refiner, i.e., in the waste stream.
$C_{w(n+1)}$ = the liquid concentration entering the $n$th section in the waste stream.
$k$ = the distribution coefficient, defined as the ratio of solute concentration in the freezing solid at the interface behind the zone to that of the bulk liquid in the zone.
$L$ = the length of a section in the direction of zone travel.
$C_P$ = the product concentration emerging at the right.
$C_W$ = the waste concentration emerging at the left.
$\gamma$ = the purification ratio, $C_P/C_W$.

The steady state equations for the batch refiner of Fig. 1 operated in accordance with the zonal mode follow:

$$C_{p(n)} = C_{w(n)} \quad (1)$$

$$\frac{C_{p(n+1)}}{C_{p(n)}} = G \quad (2)$$

$$\gamma = \frac{C_p}{C_w} = \frac{C_{p(n+1)}}{C_{w(1)}} = G^N \quad (3)$$

$$G = \frac{f(k\epsilon - 1) + (1-k)}{f(k\epsilon - 1) + \epsilon(1-k)} \quad (4)$$

where $$\epsilon = e^{B(L-l)} \quad (5a)$$

$$k = e^{\frac{Bl}{Bl}} - 1 \quad (5b)$$

Two conditions of cross-flow are discussed below. In accordance with the first, $f$ = unity; in accordance with the second, $f$ is less than unity.

When $f = 1$, G has the value $k$ as is seen from Equation 4. Hence, the purification ratio, G, in both product and waste streams from section to section is equal to $k$. A refiner with N sections, therefore, provides a ratio, $\gamma$, of $k^N$.

Reference is made to Fig. 4 in describing the solute concentrations in the liquid and solid regions of the $n$th section of a batch refiner, at various times during the cycle. This figure is a plot of solute concentration on the ordinate against distance along the section on the abscissa. Line $ade$ represents the concentration in the solid when a zone of length, $l$, reaches the end of the section. This concentration is $C_{p(n+1)}$.

At the start of a cycle, the first zone length, $l$, is melted and its liquid, of concentration, $C_{p(n+1)}$, is transferred to the $(n+1)$st section. It is replaced by liquid of concentration, $C_{p(n)}$, from the $(n-1)$st section. The value of $C_{p(n)}$ is $C_{p(n+1)}/k$. Line *bcdeh* shows the solute concentrations in liquid and solid as the zone begins its travel. Line *adefg* shows these concentrations after the zone reaches the end of the section. What the zone has done is to transfer the amount of solute represented by the area, *abcd*, from the product stream to the waste stream. During the waste steram shift, area *jfgk* is transferred to the $(n-1)$st section (as $C_{w(n)}$) and replaced by area *jehk* (as $C_{w(n+1)}$).

The action of the zone during the cycle is therefore a zone leveling operation of the type described in Fig. 9 of "Principles of Zone Melting" by W. G. Pfann (Trans. AIME, 194, 747 (1952)).

It is seen that the described cycle represents a steady state condition provided that a ratio $k$ exists between liquids in adjacent sections. This condition obtains when $f=1$.

From Fig. 4 it is seen that the material between the first and last zone positions does no useful work. In principle, then, a section of only two zone lengths is required. Where, however, the two terminal zonal positions are simultaneously molten, and in practice, even where only one zone is used, it is necessary to maintain a neutral section of at least about 0.5 zone lengths between the first and last zonal positions to prevent mixing of product and waste flows.

The reflux cross-flow refiner operated in the zonal mode for a value of $f=1$, gives a degree of purification roughly comparable with the ultimate distribution resulting from the use of the conventional batch zone-refining operation, in the same size apparatus, the conventional refiner having a length expressed in zone lengths approximately equal to the number of sections N and having a zone width equal to the section length of the reflux cross-flow refiner. The degree of separation obtainable by the use of reflux cross-flow refining may be increased by operating at a transfer fraction $f$ less than unity. The following discussion relates to such operation.

The effect of decreasing $f$ below unity is to increase the concentration gradient along each section of the refiner. For very small values of $f$ it may be desirable to increase the section length. In general, the separation ratio G is not substantially affected by the existence of this concentration gradient, for values of $f$ greater than $\sim 0.1$, if there are two or three zone lengths of solid material between the two terminal zonal positions. This is illustrated in the following example.

EXAMPLE 1

Let $k=0.5$ and zone length $l$ be equal to unity. From Equation 5b, $B=+1.2$ and $\epsilon=36.6$. Let the number of zone lengths in the section of length L be 4, let $f=0.5$. Substituting in Equation 4:

$$G = \frac{0.5(0.5 \times 36.6)+(0.5)}{0.5(0.5 \times 36.6)+36.6(0.5)} = 0.32$$

The same calculations for section length L of 10 results in a value of $\epsilon=8100$, so that G is equal to 0.333. It is therefore apparent that the value of G is substantially insensitive to section length for a value L equal to 4 or greater for an $f$ of 0.5.

Table I is illustrative of the improvement in separation ratio between adjacent sections resulting from a decrease in the value of $f$. The assumption is made that the section length is sufficiently great so as to have substantially no effect on the value of G. The section length meeting this requirement may be of the order of 5 zone lengths long.

*Table I*

| $f$ | 1.0 | .50 | .33 | .25 | .20 | .11 |
|---|---|---|---|---|---|---|
| $G$ | .50 | .33 | .25 | .20 | .167 | .10 |

Certain of the essential concentrations in a reflux cross-flow refiner operated in batch in a steady state, are shown in Fig. 5. The refiner depicted consists of receptacle 70 separated into five sections 71, 72, 73, 74 and 75 by partitions 76, each provided with orifices 77 and 78. Completion of the flow path is indicated by dashed line 79 joining ports 80 and 81, and by dashed line 82, joining ports 83 and 84. The section length L is equal to four zone lengths for each of the five sections 71 through 75. The quantities set forth on the figure denote the relative liquid concentrations at the beginning and end of each section just after the zone reaches the end of the section. The reference point is the zonal position corresponding with port 83. The fact that the concentrations for the first zonal position in any section correspond with that of the last zonal position for each subsequent section, indicates that $C_{p(n)}=C_{w(n)}$ and that the same ratio G exists between $C_{p(n+1)}$ and $C_{p(n)}$ as does along a given section between $C_{p(n+1)}$, the mean concentration in the first zone length and $C_{w(n)}$ the liquid concentration in the last zone length. Since $G<k$, the end concentrations in a given section differ by more than a ratio, $k$.

The solute concentrations in the solid portions intermediate both terminal zonal positions in any given section are not indicated, since they do not change during the cycle.

Note that when $\epsilon$ in Equation 4 is large compared to the other terms, which is usually the case, then G is given to a good approximation by:

$$G \doteq \frac{fk\epsilon}{fk\epsilon+(1-k)\epsilon} \doteq \frac{1}{1+\frac{1-k}{kf}} \quad (4a)$$

The relationship between $C_P$, $C_W$ and the mean concentration $C_0$ for the condition in accordance with which $f=1$, so that $G=k$, is determined as follows: In accordance with this assumption, the relationship between $C_p$ and the mean starting concentration $C_0$ is found by adding the amounts of solute in the various sections. Using the expression for the sum of a simple geometric progression it is found that $$C_P = C_0 \frac{(k^{-1}-1)T}{(T-1+k^{-1})(k^{-N+1}1)} \quad (6)$$

and $$C_W = C_P k^{-N} \quad (7)$$

where T denotes zone lengths per section.

Equation 6 is exact. For $f$ less than 1, G may be substituted for $k$. With such substitution Equation 6 is a useful first order approximation.

Fig. 6 is a schematic plan view of an enriching section. The section depicted may constitute an entire refiner or may be a part of a two-section refiner. The apparatus depicted includes receptacle 90 divided into sections 91 by partitions 92, each partition having a product stream orifice 93 and a waste stream orifice 94. The heating arrangement, not shown, but which may be similar to any of those described above, produces a molten zone or zones, here shown as corresponding with zonal positions 95 and 96. Material 97 is shown solid. In operation, feed material of composition $C_f$ is introduced into the refiner through port 98. With regions 95 and 96 molten, as shown, plug-like movement starting at port 98 and proceeding counter-clockwise through orifices 93 and port 99, from which position a certain amount of product material 103 is withdrawn, the remainder passing through pipe 100, port 101, orifices 94 and out port 102. Where the section depicted operates as a complete refiner, a certain amount of waste material is withdrawn from 102 and the remainder is passed through a pipe not shown and caused to reenter the refiner through port 98. Where the section depicted is part of a two-section refiner, material leaving port 102 enters a stripping section, either directly or through a mixing section to be discussed later, circulates through the stripping section from which an amount of waste material is withdrawn, said amount being less than the cross-flow volume, the remainder being caused to pass through the stripping section and back into the enriching section through port 98.

Whether operated as a complete refiner or as a part of a two-section refiner, the transfer fraction passing through orifices 93 in the apparatus of Fig. 6 may be considered equal to $(p+f)$. The fraction removed as 103 is equal in volume to $p$ in accordance with such convention. The remaining volume, $f$, is returned to the waste stream through port 101 in the Nth section so that the transfer fraction in the waste stream is equal to $f$.

Design equations for the enriching section are set forth below. The following symbols are used in addition to those set forth above:

$C_F$=feed concentration, which is also $C_{p(1)}$
$C_W'$=waste concentration, which is also $C_{w(1)}$ The transfer fraction is greater in the product stream in this case. The ratio of product-stream concentrations in adjacent sections is:

$$\frac{C_{p(n+1)}}{C_{p(n)}} = G_E \quad (8)$$

where sub-E denotes enriching section. $G_E$ is given by:

$$G_E \doteq \frac{f(k\epsilon - 1) + (1-k)}{f(k\epsilon - 1) + \frac{f\epsilon}{p+f}(1-k)} \quad (9)$$

The expression for $G_E$ is indicated to be approximate because the approximation:

$$\frac{C_{w(n)} - C_P}{C_{p(n)} - C_P} \doteq \frac{C_{w(n)}}{C_{p(n)}}$$

was used in determining it. This is a good approximation when the solute is a minor constituent.

As in the batch refiner, note that when $\epsilon$ in Equation 9 is large compared to the other terms, $G_E$ is given to a good approximation by:

$$G_E \doteq \frac{fk\epsilon}{fk\epsilon + f\frac{(1-k)\epsilon}{(p+f)}} \doteq \frac{1}{1 + \frac{1-k}{k(p+f)}} \quad (9a)$$

This expression is similar to (4a) except that $f$ is now replaced by $(p+f)$, the transfer fraction in the product stream of the enriching section.

Because the transfer fractions differ in the two streams it is no longer true that $C_{p(n)} = C_{w(n)}$, as was so at total reflux. Instead:

$$\frac{C_{w(n)} - C_P}{C_{p(n)} - C_P} = \frac{p+f}{f} \quad (10)$$

from which:

$$C_{w(n)} = \frac{p+f}{f} C_{p(n)} - \frac{p}{f} C_P \quad (11)$$

Hence the purification ratio, $\alpha$, using Equation 8 is:

$$\alpha = \frac{C_P}{C_F} = G_N^E \quad (12)$$

and the waste concentration ratio, $\beta'$, is:

$$\beta' = \frac{C_W'}{C_F} = \frac{f+p}{f} - \frac{p}{f} G_N^E \quad (13)$$

It may be noted that a minimum reflux ratio is indicated by Equation 9. The minimum reflux ratio occurs when $G_E = 1$, which obtains if:

$$\epsilon = \frac{p+f}{f} \quad (14)$$

If we define reflux ratio as $f/(p+f)$, it is evident that the minimum refluxing ratio can be made very small if $\epsilon$ is made large. Since $\epsilon$ increases exponentially with section length, L, a modest increase in L results in a reduction of the minimum reflux ratio by a large factor.

Fig. 7 depicts a stripping section which like the process of Fig. 6 may be operated by itself or in conjunction with its complementary section, in this instance with a stripping section as depicted in Fig. 6. This section is of the same general configuration as that shown in Fig. 6 and includes receptacle 110 divided into sections 111 by partitions 112, each having orifices 113 and 114 and is provided with strip heaters or other heating apparatus, not shown, producing corresponding molten zones in each of sections 111, here shown as zone 115, corresponding with the initial positions, and zones 116, indicating the terminal positions. Feed material, which may be an exit material leaving the apparatus of Fig. 6 at 102, enters the stripping section through port 117, passes through orifices 114 and leaves through port 118. A certain amount of material is withdrawn as 119 at this position, the remaining material being reintroduced into the stripping section via path 120 and port 121. Subsequent plug-like movement results in a left to right passage through orifices 113 and out port 122. Material leaving 122 may enter an enriching section such as that of Fig. 6 through a mixing chamber to be described in conjunction with Fig. 8 and into the enriching section via a port such as port 98 of Fig. 6. The purpose of the stripping section in accordance with the conventions set forth above is to concentrate the solute before rejecting it as waste. For the purpose of the equations which follow, the transfer fraction in the waste stream, that is, the stream in the vicinity of orifices 114, is equal to $(w+f)$ on a volume basis. The transfer fraction in the product stream through orifices 113 is accordingly equal to $f$. The equations for this section follow:

$$\frac{C_W - C_{w(n)}}{C_W - C_{p(n)}} = \frac{f}{f+w} \quad (15)$$

The sections are numbered 1 to N beginning at the waste exit. Hence:

$$C_W = C_{w(1)} \quad (16)$$

$$C_F = C_{w(N+1)} \quad (17)$$

$$C_P' = C_{p(N+1)} \quad (18)$$

where N is the number of sections. The waste concentration, $C_W$, is given by:

$$\beta = \frac{C_W}{C_F} = \frac{w+f}{w+fG_S^N} \quad (19)$$

The product concentration, $C_P'$, is given by:

$$\alpha' = \frac{C_P'}{C_F} = \frac{f+w}{f+wG_S^{-N}} \quad (20)$$

The ratio, $G_S$, is determined by the transfer fraction in the product stream, and applies to this stream only.

$$G_S = \frac{C_{p(n+1)}}{C_{pn}} \quad (21)$$

$$G_S \doteq \frac{1}{1 + \frac{1-k}{kf}} \quad (22)$$

Equation 22 is based on an approximation of the kind discussed in conjunction with Equations 4a and 9a. In accordance with such approximation, it is assumed that $\epsilon$ is larger than the other terms involved; that is, larger than any of $f$, $w$ or $k$. This approximation is considered accurate even for small transfer fractions where the section lengths are of the order of 4 or 5 zone lengths long.

The terms $\alpha'$ for the stripping section and $\beta'$ for the enriching section, are conveniently used in the related equations to make these equations consistent with those derived from the two-section refiner described in conjunction with Fig. 8.

Fig. 8 is a schematic plan view illustrating the flow diagram for a two-section reflux cross-flow zone refiner operated in continuous fashion. Transfer fractions and product and waste concentrations are consistent with those of Figs. 6 and 7. In accordance with the apparatus depicted, enriching section 130 shown to the right includes receptacle 131 divided into sections 132 by partitions 133, each having orifices 134 and 135, and product port 136 from which product stream 137 is withdrawn, said port 136 connected with entrance port 138 via pipe or other provision 139. Material reentering right hand section 130 via port 138 produces right to left plug-like flow of material through orifices 135 and out port 140. Material leaving the waste stream through port 140 is introduced into mixing chamber 141 via port 142. Here a volume of feed material $w$ is added to the volume $f$ introduced from the enriching section. The total volume $(f+w)$ leaves mixing chamber 141 through port 143 and is introduced into stripping section 144 via a port 145. Stripping section 144 is similar to that depicted in Fig. 7 and includes receptacle 145, and partitions 146, each having orifices 147 and 148. Volume $(f+w)$ introduced at port 145 results in right to left plug-like flow through orifices 147 and in the withdrawal of the same volume of material through port 149. The stream removed at 149 is divided into waste flow of volume $w$ withdrawn at stream 150 and volume $f$, which is recycled via path 151 through port 152, thereby resulting in left to right plug-like flow through orifices 148 and finally port 153, said volume $f$ of material being introduced in the mixing chamber 141 via port 154. In the mixing chamber 141 the exit flow stream of volume $f$ from the stripping section is augmented by a volume of feed material $p$, the total volume $(p+f)$ leaving the mixing chamber 141 through port 155 and being introduced into the enriching chamber 130 through port 156. Feed material of a volume equal to $(p+w)$ per cycle, is introduced in the mixing chamber 141 via port 157. For simplification, Fig. 8 does not depict pumping apparatus, valves, heaters, molten regions and certain other refinements, all of which are discussed in conjunction with the preceding figures.

From an overall solute balance, it can be shown that the ratio of flows $p$ and $w$ is:

$$\frac{p}{w} = \frac{\beta - 1}{1 - \alpha}$$

If the product and waste controls are maintained as discussed and depicted, the mixing section will have a mean concentration, $C_F$. As in distillation and other continuous processes this condition, in which the internal concentration is equal to the feed concentration at the point of addition, represents most efficient operation.

The equations given above refer to the steady operating state. Considerations of amount of material in process (holdup) and time to reach thte steady-state (start-up time) may also enter into refiner design. Such considerations may indicate the desirability of utilizing variable reflux ratios, such ratios being reduced as the distance from the feed point increases. It may also be desirable to divide the enriching section into a number of sections of different cross-section having different reflux ratios. Such considerations are analogous to those for other continuous procedures, such as distillation. Such design variables have been discussed in the literature. See for example:

(a) R. C. Jones and W. H. Furry, "The Separation of Isotopes by Thermal Diffusion," Review of Modern Physics, 18, 151 (1946) and (b) M. Benedict, Multistage Separation Processes, Trans, A. I. Ch. E., 43 (2), pp. 41–60 (1947).

A unique situation obtains in reflux cross-flow refining for the condition $f<1$. In accordance with the equations here set forth G is less than $k$ for a value of $k$ numerically less than 1, so that the concentration ratio, G, developed between the countercurrent streams in a given section is less than the distribution coefficient for the two phases at equilibrium. The moving zones, in effect, carry solute up a concentration gradient and thereby establish a concentration ratio between countercurrent streams in a given section which is greater than $1/k$.

Fig. 9 depicts a two-section continuous reflux cross-flow refining operation as carried out in apparatus alternative to that of Fig. 8. In accordance with this figure receptacle 160 is divided into sections 161 by partitions 162, each having orifices 163 and 164. One section 165, shown hatched, is maintained molten and acts in a manner similar to that of mixing chamber 141 of Fig. 8 separating enriching section 166 and stripping section 167. Feed material is introduced into the mixing chamber 165 through port 168. Product and waste materials are withdrawn through ports 169 and 170, respectively. Flow streams 171 in the enriching section and 172 in the stripping section result in reflux flows from port 169 to port 173 and port 170 to port 174, respectively. As in Fig. 8, certain refinements including pumps, molten zones, etc., are not shown.

Fig. 10 is a perspective view of a completely closed two-part continuous reflux cross-flow apparatus. The apparatus depicted operates in the fashion described in conjunction with Figs. 8 and 9, and consists of receptacle 180 provided with lid 181 and partitions 182, each having orifices 183 and 184, separating sections 185. Strip heaters 186 and 187 produce molten zones here shown as 188 and 189. Molten zones 188 and 189 are separated by solid regions 190. Material within mixing section 191 is maintained molten by heater 192. With heaters and molten regions in the position shown, plug-like motion in counterclockwise direction is produced by pump 193 and by the addition of a controlled amount of feed material through pipe 194, said feed being equal in amount to the total volume of product withdrawn through pipe 195 and waste withdrawn through pipe 196. Product material not withdrawn is recycled through pipe 197 and pump 193, said pipe connecting ports 198 and 199. Material of waste composition not withdrawn through pipe 196 is recycled from port 197 to port 198 through pipe 199.

The invention has been discussed in terms of interface movement resulting from moving molten zones. One strip heater arrangement resulting in suitable interface progression is shown in Figs. 11A, 11B, 11C and 11D. In accordance with such figures strip heaters 210 and 211 resulting in molten zones 212 and 213 are caused to move from left to right at a rate corresponding with that of desired molten zone traversal. The positions shown in Fig. 11A correspond with the time of cross-flow as described above. As heater 210 moves from left to right, it passes through the positions shown in Figs. 11B and 11C. When the trailing interface of molten zone 212 comes within a zone length of the end of the section in the direction of traversal the strip heaters are rapidly returned to the positions shown in Fig. 11D, thereby resulting in terminal zones 214 and 212. Cross-flow is produced and the cycle is repeated as described above.

Figure 11A:
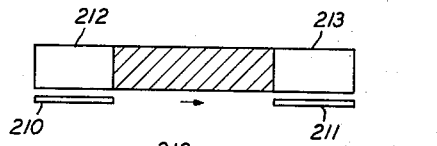
Figure 11B:
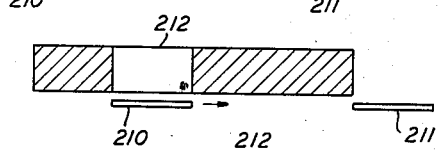
Figure 11C:
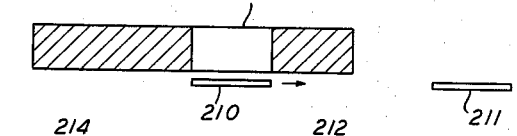
Figure 11D:
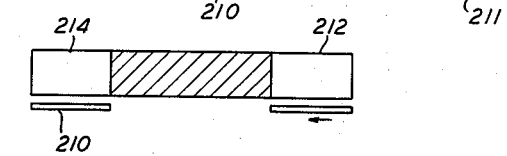

An alternate mode of heater operation in Figs. 11A to 11D is to keep heater 211 always in its position in Fig. 11A; advance heater 210 slowly until it coincides with heater 211 in position; then return heater 210 rapidly to its starting position shown in Fig. 11A; then produce cross-flow; and repeat the cycle.

Figure 12A:
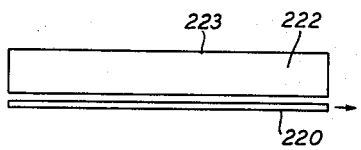
Figure 12B:
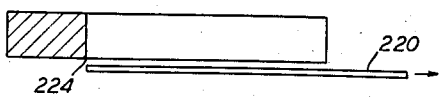
Figure 12C:
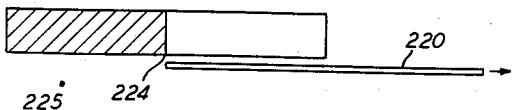
Figure 12D:
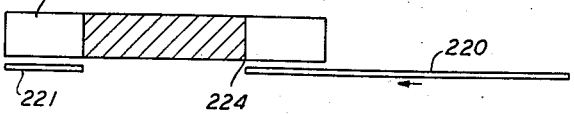

The mode of operation depicted in Figs. 12A, 12B, 12C and 12D is by normal freezing, rather than zone melting. In accordance with this variation two heaters, 220 and 221 having the general configuration depicted are utilized. In Fig. 12A, all of material 222 contained in the section 223 depicted is molten. Gradual movement of heater 220 in the desired direction of interface traversal results in the passage of interface 224 through the positions shown in Figs. 12B and 12C. In Fig. 12D interface 224 has reached its ultimate position and heater 221 is now adjacent section 223 so as to result in second molten region 225. With molten and solid regions as depicted in Fig. 12D, cross-flow is produced in the manner described above. The normal freezing mode of operation described in conjunction with Figs. 12A through 12D is alternative to the zonal mode described in conjunction with Figs. 11A through 11B. In general, the heat economy realized through use of the zonal mode indicates a preference for that type of operation, especially for high melting materials.

The following examples indicate the degree of separation and volume flow rate of product; for a continuous enriching part (Example 2); for a continuous stripping part (Example 3); and for a two part refiner (Example 4).

EXAMPLE 2

Given an enriching-section refiner, such as in Fig. 6 having $N=4$ sections, of length L equal to 4 zone lengths, a volume flow $(f+p)=1$ cubic inch in the product stream, a volume flow, $p=0.5$ cubic inch of product, and a reflux flow, $f=0.5$ cubic inch, in the waste stream, a distribution coefficient, $k=0.2$, at an interface traversal rate, $v$, of about 0.004 inch per second, and a zone length, $l$, of unity. Find the purification ratio $\alpha = C_P/C_F$, the enrichment ratio, $\beta' = C_W'/C_F$, and the volume flow rates of product and waste.

The ratio, $G_E$, is:

$$G_E \doteq \frac{1}{1+\frac{1-k}{k(p+f)}} = \frac{1}{1+\frac{.8}{.2(1)}} = 0.2$$

The purification ratio, $\alpha$, is:

$$\alpha = \frac{C_P}{C_F} = G_N^E = 0.2^4 = 0.0016$$

The enrichment ratio, $\beta$, is:

$$\beta = \frac{C_W'}{C_F} = \frac{f+p}{f} - \frac{p}{f} G_N^E \doteq 2$$

The volume flow rate, $p$, of product per cycle, assuming a zone cross-sectional area in one section of 1 square inch, is:

$$pV = 0.5 \text{ cubic inch}$$

where $V=$ zone volume $=$ one cubic inch. The cycle time (neglecting the short time for liquid cross-flow transfer) is the interface traversal time, $t$, which is:

$$t = \frac{L-l}{v} = \frac{3}{0.004} = 750 \text{ seconds}$$

The volume flow of product per unit of time is:

$$\frac{pV}{t} = \frac{0.5}{750} = 6.7 \times 10^{-4} \text{ cubic inches per second}$$

$$= 2.4 \text{ cubic inches per hour.}$$

The volume flow of waste, per unit of time, is proportional to $$\frac{f}{p+f} = 0.5$$

and is equal to the volume flow of product per unit time.

EXAMPLE 3

Given the same feed material as in Example 2, and a stripping section having $N=2$ sections, and the parameters: $f=0.5$, $(f+w)=0.6$, find $\alpha'$, $\beta$, and the volume flows of waste and product.

$$G_S \doteq \frac{1}{1+\frac{1-k}{kf}} = \frac{1}{1+\frac{0.8}{(0.2)(0.5)}} = 0.11$$

$$\alpha' = \frac{f+w}{f+WG_S^{-N}} = \frac{0.6}{0.5+.1(0.11^{-2})} = 0.07$$

$$\beta = \frac{f+w}{W+fG_N^S} = \frac{0.6}{0.1+0.5(.11)^2} = 5.7$$

Assuming the same section length, L, and zone dimensions as in Example 2, the volume flows per unit time are:

Product flow $=2.4$ cubic inches per hour
Waste flow $=0.48$ cubic inch per hour

EXAMPLE 4

Given the feed material of the previous examples, the same ratios $\alpha$ and $\beta$ for the exit materials, and the same transfer fractions, $f$, $p$, and $w$, it is desired to find the ratio of zone volumes to be used in the enriching and stripping sections. This ratio is dictated by the relation:

$$\frac{p}{w} = \frac{\beta-1}{1-\alpha}$$

where $p$ and $w$ now denote relative volume flows per cycle. Thus:

$$\frac{p}{w} = \frac{5.7-1}{1-.0016} = 4.7$$

The ratio $p/w$, where $p$ and $w$ are expressed as fractions transferred in Examples 2 and 3 for zones of equal size, was $(p/w)=.5/.1=5$, which is nearly equal to the volume ratio 4.7 required. Hence, the cross-sectional area of an individual zone in the enriching section must be reduced to 4.7/5.0 of its value. This can be done simply by reducing the height of material in a section. As an engineering approximation it is usually sufficient to use equal zone volumes in both the enriching and stripping sections.

For convenience, the invention has been described in terms of only a small number of apparatus groups and in terms of solutes of concern having a distribution factor numerically less than unity. Many other groups of apparatus equally suitable for the practice of this invention will occur to those skilled in the art. Material flows, which need not be at an angle of 180°, may be produced by other means as, for example, by gravity. Other groups of cross-flow as, for example, by overflow rather than through orifices and by transfer of solid material rather than liquid are suitable and may be preferred. In accordance with the characteristics of the material undergoing treatment, the plane of operation need not be horizontal or vertical and in fact, need not be fixed during the entire cycle. As in copending application, Serial No. 791,216, filed March 5, 1958, plug-like flow may be secured by draining the desired fraction of material from section to section proceeding in a backward direction relative to cross-flow progression. Other apparatus variations discussed in this copending application are equally applicable here.

For example, the refiner of Fig. 8 has been discussed in terms of a single feed introduction point and mixing chamber. A suitable alternate procedure is to introduce feed at two points, one at either end of an intermediate section. Even more desirable is to introduce feeds at the location in each stream where the concentration in that stream equals the feed concentration.

The processes of this invention are essentially manipulative. It is believed the description herein taken in conjunction with the known mechanisms of zone melting and normal freezing are sufficient description of the inventive processes. The use of protective atmospheres, flow valves and other apparatus and process refinements are considered to be well within the knowledge of those skilled in the art as dictated by the particular materials undergoing processing.

What is claimed is:
1. The method for redistributing ingredients of a fusible material containing at least one solute having a liquid-solid distribution coefficient which differs from unity in such material, comprising establishing in a solid phase of the said fusible material at least two moving solid-liquid interfaces having distinct paths of traversal and establishing at at least two positions along each of the said traversal paths a material transfer path transverse to the said traversal paths, the relationship between traversal paths and transfer paths being such that the said at least two solid-liquid interfaces move unidirectionally with respect to the said transfer paths, the said transfer paths being in opposite direction relative to the said traversal paths, and recycling at least a portion of the material withdrawn from the terminus of each of the said transfer paths through each of the other transfer paths.

2. The method of claim 1 in which the entire volume of material leaving each of the said material transfer paths is recycled through the other of the said material transfer paths.

3. The method of claim 1 in which a portion of material is withdrawn at the end of at least one of the said material transfer paths.

4. The method of claim 3 in which the said portion of material is withdrawn from the transfer path closest to the origins of the said traversal paths.

5. The method of claim 3 in which the said portion of material is withdrawn from the transfer path closest to the ends of the said traversal paths.

6. The method of claim 1 in which a portion of material is withdrawn at the end of each of the said transfer paths and in which feed material is introduced into each of the said transfer paths in volume equal to the volume withdrawn therefrom.

7. The method of claim 6 in which feed material is introduced into the said transfer paths at a position corresponding to a single traversal path.

8. The method of claim 6 in which feed introduction is into a molten region joining both of the said transfer paths.

9. The method of claim 1 in which there are at least four traversal paths, in which the said transfer paths are liquid, in which transfer is plug-like from traversal path to traversal path and in which the amount of material transferred in each transfer path is equal in volume to the total amount of liquid material present in the corresponding position of each traversal path.

10. The method of claim 1 in which there are at least four traversal paths, in which the said transfer paths are liquid, in which transfer is plug-like from traversal path to traversal path and in which the amount of material transferred in each transfer path is less than the total amount of liquid material present in the corresponding position of each traversal path.

References Cited in the file of this patent

UNITED STATES PATENTS

| | | |
|---|---|---|
| 2,541,069 | Jones et al. | Feb. 13, 1951 |
| 2,739,046 | Pfann | Mar. 20, 1956 |